(12) United States Patent
Ji et al.

(10) Patent No.: US 11,599,417 B2
(45) Date of Patent: Mar. 7, 2023

(54) ERROR CORRECTION SYSTEM

(71) Applicant: CHANGXIN MEMORY TECHNOLOGIES, INC., Hefei (CN)

(72) Inventors: Kangling Ji, Hefei (CN); Jun He, Hefei (CN); Yuanyuan Gong, Hefei (CN); Zhan Ying, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 17/582,185

(22) Filed: Jan. 24, 2022

(65) Prior Publication Data

US 2022/0222140 A1 Jul. 14, 2022

Related U.S. Application Data

(63) Continuation of application No. PCT/CN2021/111414, filed on Aug. 9, 2021.

(30) Foreign Application Priority Data

Jan. 14, 2021 (CN) .......................... 202110050726.6

(51) Int. Cl.
 *G06F 11/10* (2006.01)
 *H03K 19/17736* (2020.01)
 *H03K 19/1776* (2020.01)

(52) U.S. Cl.
 CPC ................................ *G06F 11/1068* (2013.01)

(58) Field of Classification Search
 CPC .................................................. G06F 11/1068
 See application file for complete search history.

(56) References Cited

U.S. PATENT DOCUMENTS

| | | | |
|---|---|---|---|
| 4,084,236 A * | 4/1978 | Chelberg | G06F 12/126 711/E12.075 |
| 4,622,602 A * | 11/1986 | Kutaragi | G11B 20/10 |
| 4,730,321 A * | 3/1988 | Machado | G11B 20/1809 |
| 5,859,858 A | 1/1999 | Leeman | |
| 5,936,870 A | 8/1999 | Im | |
| 6,891,690 B2 | 5/2005 | Asano | |
| 7,653,862 B2 | 1/2010 | Hassner | |
| 8,225,175 B2 | 7/2012 | Chen | |

(Continued)

FOREIGN PATENT DOCUMENTS

| | | |
|---|---|---|
| CN | 1242088 A | 1/2000 |
| CN | 1881477 A | 12/2006 |

(Continued)

*Primary Examiner* — Guy J Lamarre
(74) *Attorney, Agent, or Firm* — Cooper Legal Group, LLC (57) ABSTRACT

An error correction system is disclosed. The error correction system is applied to a storage system. The error correction system generates X first operation codes, Y second operation codes and a third operation code based on the storage system. The error correction system includes an error state determining circuit and M decoding circuits. The error state determining circuit is configured to identify a current error state. When a plurality of pieces of data have a 1-bit error, the M decoding circuits are configured to execute decoding processing on the X first operation codes and the Y second operation codes, to obtain whether there is erroneous data in the bytes corresponding to the decoding circuits and locate a bit to which the erroneous data belongs.

17 Claims, 5 Drawing Sheets

(56) References Cited

U.S. PATENT DOCUMENTS

| | | |
|---|---|---|
| 8,560,916 B2 | 10/2013 | Yang |
| 8,862,963 B2 | 10/2014 | Nakanishi |
| 9,411,686 B2 | 8/2016 | Yang et al. |
| 9,754,684 B2 | 9/2017 | Hu et al. |
| 9,985,655 B2 | 5/2018 | Jeganathan et al. |
| 9,985,656 B2 | 5/2018 | Jeganathan et al. |
| 2004/0015680 A1* | 1/2004 | Matsuo ............. G06F 9/34 712/E9.035 |
| 2004/0095666 A1 | 5/2004 | Asano |
| 2005/0273678 A1 | 12/2005 | Dietrich |
| 2007/0011598 A1 | 1/2007 | Hassner |
| 2009/0217140 A1* | 8/2009 | Jo ............. G06F 11/1068 714/E11.032 |
| 2011/0191651 A1 | 8/2011 | Chen |
| 2011/0239082 A1 | 9/2011 | Yang |
| 2012/0311408 A1 | 12/2012 | Nakanishi |
| 2015/0058700 A1 | 2/2015 | Yang et al. |
| 2016/0080002 A1* | 3/2016 | Ramaraju ............. G06F 3/064 714/764 |
| 2017/0060677 A1 | 3/2017 | Jeganathan et al. |
| 2017/0060679 A1 | 3/2017 | Jeganathan et al. |
| 2017/0091024 A1* | 3/2017 | Bandic ............. H03M 13/616 |
| 2017/0185478 A1* | 6/2017 | Sakai ............. G06F 11/1048 |
| 2017/0353271 A1 | 12/2017 | Kudekar et al. |
| 2018/0205498 A1 | 7/2018 | Kudekar et al. |
| 2019/0034270 A1 | 1/2019 | Byun et al. |
| 2019/0280817 A1 | 9/2019 | Kudekar et al. |
| 2021/0089392 A1* | 3/2021 | Shirakawa ............. G06F 11/1012 |
| 2022/0223221 A1* | 7/2022 | Ji ............. G11C 29/42 |
| 2022/0230701 A1* | 7/2022 | Ji ............. G11C 29/18 |
| 2022/0365844 A1* | 11/2022 | Ji ............. H03K 19/20 |

FOREIGN PATENT DOCUMENTS

| | | |
|---|---|---|
| CN | 101183565 A | 5/2008 |
| CN | 101980339 A | 2/2011 |
| CN | 102339641 A | 2/2012 |
| CN | 102543209 A | 7/2012 |
| CN | 102810336 A | 12/2012 |
| CN | 102857217 A | 1/2013 |
| CN | 103078629 A | 5/2013 |
| CN | 104425019 A | 3/2015 |
| CN | 105471425 A | 4/2016 |
| CN | 105471425 B | 5/2018 |
| CN | 108038023 A | 5/2018 |
| CN | 109036493 A | 12/2018 |
| CN | 109308228 A | 2/2019 |
| CN | 110968450 A | 4/2020 |
| CN | 111443887 A | 7/2020 |

* cited by examiner

| Byte | 0 | | | | | | | |
|---|---|---|---|---|---|---|---|---|
| Bit | 0 | 1 | 2 | 3 | 4 | 5 | 6 | 7 |
| pc0 |   | × |   | × |   | × |   | × |
| pc1 |   |   | × | × |   |   | × | × |
| pc2 |   |   |   |   | × | × | × | × |

| Byte | 0 | 1 | 2 | 3 | 4 | 5 | 6 | 7 | 15 | 14 | 13 | 12 | 11 | 10 | 9 | 8 |
|---|---|---|---|---|---|---|---|---|---|---|---|---|---|---|---|---|
| pc3 | × |   | × | × | × | × | × |   |   |   |   |   |   |   |   | × |
| pc4 | × | × |   |   | × | × |   | × |   |   |   | × |   | × | × |   |
| pc5 |   | × | × |   | × |   | × |   |   | × | × |   | × |   | × |   |
| pc6 |   |   |   | × |   | × | × | × | × | × |   |   | × | × |   |   |
| pc7 |   |   |   |   |   |   |   |   |   | × |   | × | × | × | × | × |

ERROR CORRECTION SYSTEM

CROSS-REFERENCE TO RELATED APPLICATIONS

The present application is a continuation of International Patent Application No. PCT/CN2021/111414, filed on Aug. 9, 2021, which is based on and claims priority to Chinese Patent Application No. 202110050726.6, filed to the China National Intellectual Property Administration on Jan. 14, 2021 and entitled "Error Correction System". The disclosures of International Patent Application No. PCT/CN2021/111414 and Chinese Patent Application No. 202110050726.6 are hereby incorporated by reference in their entireties.

BACKGROUND

Semiconductor storage may be divided into nonvolatile storage and volatile memory. A Dynamic Random Access Memory (DRAM), serving as the volatile storage, has the advantages of high storage density, fast read-write speed, and the like, and is widely applied to various electronic systems.

With the more advanced manufacturing process and higher storage density of the DRAM, errors may occur in stored data in the DRAM, which may seriously affect the performance of the DRAM. Therefore, an Error Checking and Correction or Error correction Coding (ECC) technology is usually applied to the DRAM to detect or correct the errors in the stored data.

SUMMARY

Embodiments of the present disclosure relate, but are not limited, to an error correction system.

The embodiments of the present disclosure provide an error correction system, which is applied to a storage system. The storage system is configured to write or read a plurality of pieces of data during a reading operation or writing operation, the plurality of pieces of data are divided into M bytes, each byte has N pieces of data located in respective bits; the storage system has an encoding stage and a decoding stage, the error correction system is configured to generate X first operation codes, Y second operation codes and a third operation code based on the storage system in the decoding stage, the X first operation codes, the Y second operation codes and the third operation code are used to determine error states of the plurality of pieces of data, and when the plurality of pieces of data have a 1-bit error, the Y second operation codes are used to locate a specific byte to which the 1-bit error belongs, and the X first operation codes are used to locate a specific bit to which the 1-bit error belongs, the first operation codes are used to detect and/or correct the N pieces of data, the second operation codes are used to detect and/or correct the M bytes. The error correction system includes: an error state determining circuit, configured to execute decoding processing on the X first operation codes, the Y second operation codes and the third operation code to identify a current error state; and M decoding circuits, each decoding circuit corresponding to one byte, configured to execute decoding processing on the X first operation codes and the Y second operation codes, to obtain whether there is erroneous data in the bytes and locate a bit to which the erroneous data belongs.

BRIEF DESCRIPTION OF THE DRAWINGS

One or more embodiments are exemplified by the figures in the corresponding drawings. These exemplary descriptions do not constitute a limitation on the embodiments. Elements with the same reference numerals in the drawings are represented as similar elements. Unless otherwise stated, the figures in the drawings do not constitute a proportion limit.

DETAILED DESCRIPTION

The embodiments of the present disclosure provide an error correction system, which is applied to a storage system. The storage system writes or reads multiple pieces of data during a reading operation or writing operation. The multiple pieces of data are divided into M bytes, and each byte has N pieces of data located in respective bits. In the decoding stage, the storage system generates X first operation codes, Y second operation codes and a third operation code. The first operation codes, the second operation codes and the third operation code are used to determine error states of the multiple pieces of data. The first operation codes are used to execute error detection and/or error correction on the N pieces of data, and the second operation codes are used to execute error detection and/or error correction on the M bytes. The error correction system includes an error state determining unit configured to identify a current error state and a decoding unit configured to locate a specific byte and a specific bit to which the erroneous data belongs. By the adoption of the error correction system provided by the embodiment of the present disclosure, a 1-bit error can be detected and corrected, and a 2-bit error can also be detected.

To make the objectives, technical solutions, and advantages of the embodiments of the present application clearer, various embodiments of the present application are described below in detail with reference to the accompanying drawings. However, it is to be understood by those ordinary skilled in the art that in the various embodiments of the present disclosure, many technical details have been proposed in order to make a reader better understand the present disclosure. However, even without these technical details and various variations and modifications based on the following embodiments, the technical solutions claimed in the present disclosure may also be implemented.

Figure 1:
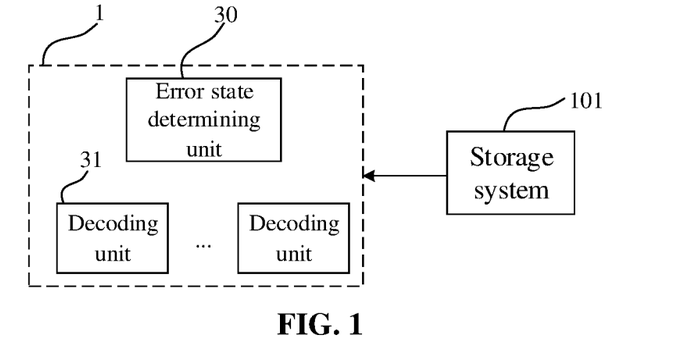
FIG. 1 is a functional block diagram of an error correction system and a storage system according to an embodiment of the present disclosure.
Figure 2:
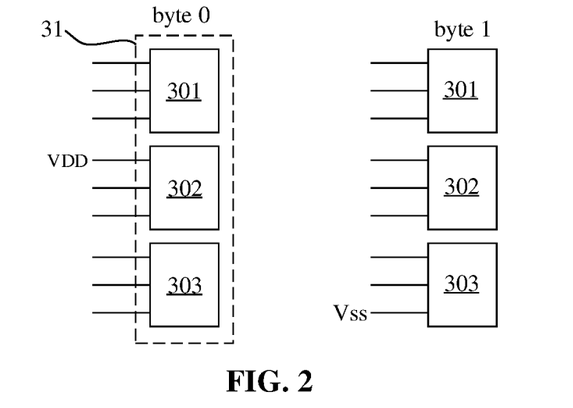
FIG. 2 is a schematic structural diagram of an error correction system according to an embodiment of the present disclosure.
Figure 3:
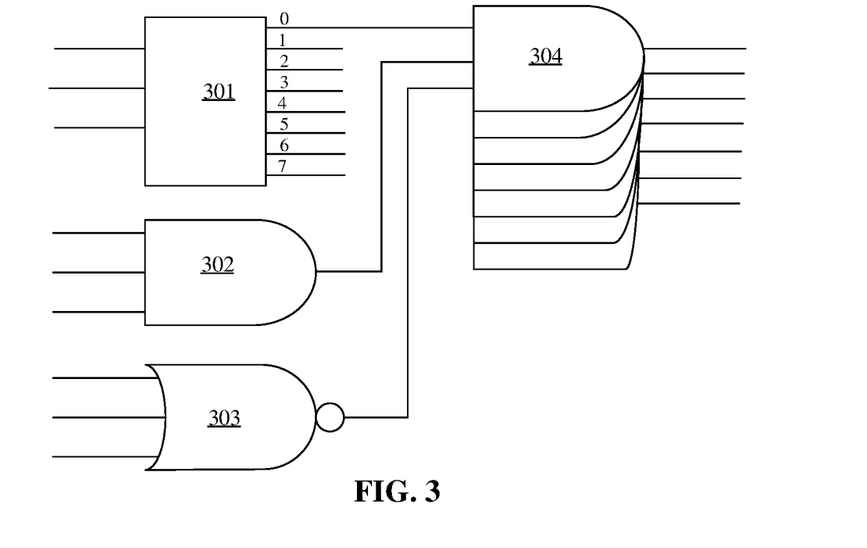
FIG. 3 is an enlarged structure diagram of a decoding unit corresponding to each byte in FIG. 2.

FIG. 1 is a functional block diagram of an error correction system and a storage system according to an embodiment of the present disclosure. FIG. 2 is a schematic structural diagram of an error correction system according to an embodiment of the present disclosure. FIG. 3 is an enlarged structure diagram of a decoding unit corresponding to each byte in FIG. 2. It is to be noted that the units and modules in the error correction system may be implemented or embodied by, for example, circuits.

Referring to FIGS. 1-3, in the embodiments, the error correction system 1 is applied to the storage system 101. The storage system 101 writes or reads multiple pieces of data during a reading operation or writing operation. The multiple pieces of data are divided into M bytes, and each byte has N pieces of data located in respective bits. The storage system 101 has an encoding stage and a decoding stage. In the decoding stage, the error correction system 1 generates X first operation codes, Y second operation codes and a third operation code based on the storage system 101. The X first operation codes, the Y second operation codes and the third operation code are used to determine error states of the multiple pieces of data. When the multiple pieces of data have a 1-bit error, the Y second operation codes are used to locate a specific byte to which the 1-bit error belongs, and the X first operation codes are used to locate a specific bit to which the 1-bit error belongs. The error correction system 1 includes: an error state determining unit 30, configured to execute decoding processing on the X first operation codes, the Y second operation codes and the third operation code to identify a current error state and M decoding units 31, each decoding unit 31 corresponding to one byte, configured to execute decoding processing on the X first operation codes and the Y second operation codes, to obtain whether there is erroneous data in the byte and locate a bit to which the erroneous data belongs.

Specifically, the current error state includes: a 0-bit error, the 1-bit error, and the 2-bit error. It is to be understood that the first operation codes are used to execute error detection and/or error correction on the N pieces of data in each byte, and the second operation codes are used to execute error detection and/or error correction on the M bytes. It is to be noted that the first operation codes in the embodiment are used to execute error detection and/or error correction on the N pieces of data in each byte, and the second operation codes are used to execute error detection and/or error correction on the M bytes. It is to be understood that all the first operation codes and the second operation codes are jointly used to execute error detection and/or error correction on all data in the M bytes, the second operation codes are used to locate which byte of the M bytes the erroneous data is located, and the first operation codes are used to locate which bit of the byte the erroneous data is located.

The error state determining unit 30 is configured to determine a bit to which the erroneous data belongs in accordance with the first check codes, the second check codes, the third check code. The error state includes the 0-bit error, the 1-bit error and the 2-bit error. Specifically, in an example, the determination principle is as follows.

If the third operation code is 1, and the first operation codes and the second operation codes are not all 0, it represents that the erroneous data is bit 1. The 1-bit error may appear in the data or may appear in the first check codes or the second check codes. At the moment, error detection and/or error correction is executed through the decoding unit 31. The principle of detecting the location of the erroneous data by the decoding unit 31 will be described in detail later, and will not be described herein.

If the third operation code is 1, and the first operation codes and the second operation codes are all 0, it represents that the data read by the storage system does not have an error, and the third check code has an error, which may be corrected or not corrected. Those skilled in the art may choose by themselves as needed.

If the third operation code is 0, and the first operation codes and the second operation codes are all 0, it represents that the read data does not have an error, and none of the first check codes, the second check codes and the third check code have an error.

If the third operation code is 0, and the first operation codes and the second operation codes are not all 0, it represents that the erroneous bit number is bit 2. At the moment, correction cannot be executed, and those skilled in the art may design to send the erroneous information to a control device as needed.

It is to be noted that the premise described above is to assume that there is only the 2-bit error at most.

The error state determining unit 30 is connected with M decoding units 31. If the 1-bit error exists (i.e., the situation that the third operation code is 1, and the first operation codes and the second operation codes are not all 0), the erroneous data may be located by employing the M decoding units 31.

FIG. 2 illustrates a schematic structural diagram of a decoding unit corresponding to 2 bytes. The error correction system provided by the embodiment will be described in detail with reference to the accompanying drawings.

Referring to FIG. 2 and FIG. 3, the decoding unit 31 includes: a decoder 301, configured to receive the X first operation codes and output N first decoding signals, each first decoding signal corresponding to a bit of the N pieces of data, and N being greater than X; a first AND gate unit 302, configured to receive Z selected operation codes and execute a logic AND operation, the selected operation codes being the second operation codes corresponding to the byte in the Y second operation codes; a NOR gate unit 303, configured to receive (Y-Z) unselected operation codes and execute a logic NOR operation, the unselected operation codes being the second operation codes except the selected operation codes; and N second AND gate units 304, an input end of each second AND gate unit 304 being connected with an output end of the first AND gate unit 302, an output end of the NOR gate unit 303 and a first decoding signal, error detection and/or error correction on the storage system 101 being executed based on the outputs of N second AND gate unit 304. Herein, X, Y and N are all positive natural numbers, and Z is an integer greater than or equal to $(Y-1)/2$ and less than or equal to $(Y+1)/2$.

In the embodiment, X is 3 and N is 8. The corresponding decoder 301 is a three-eight decoder. The decoder 301 has 3 input ends and 8 output ends. The number of the second AND gates 304 is 8, that is, N is 8.

Due to the fact that Z is the integer greater than or equal to $(Y-1)/2$ and less than or equal to $(Y+1)/2$, the sum of the number of the input ends of the first AND units 302 and the number of the input ends of the NOR gate unit 303 is the minimum, and the input ends of the first AND gate units 302 and the input ends of the NOR gate units 303 can all be effectively used.

In an example, Y is 5, and Z is greater than or equal to 2 and less than or equal to 3. If the first AND gate unit 302 receives two selected operation codes, that is, the first AND gate unit 302 needs 2 input ends, the NOR gate unit 303 receives 3 unselected operation codes, that is, the NOR gate unit 303 needs 3 input ends. If the first AND gate unit 302 receives 3 selected operation codes, that is, the first AND gate unit 302 needs 3 input ends, the NOR gate unit 303 receives 2 unselected operation codes, that is, the NOR gate unit 303 needs 2 input ends.

In a specific example, the first AND gate unit 302 has three input ends. The first AND gate unit 302 is further configured such that an input end of the first AND gate unit 302 is connected to a power supply VDD if the number of the selected operation codes is 2. Correspondingly, the NOR gate unit 303 has three input ends. The NOR gate unit 303 is further configured such that one input end of the NOR gate unit 303 is grounded Vss if the number of the unselected operation codes is 2.

Since the first operation codes are used to execute error detection and/or error correction on the N pieces of data, if the storage system has 1-bit error data, it can be learned through N first decoding signals output by the decoder 301 which bit of data of the N different bits has an error. However, through the N first decoding signals, it is impossible to learn in which byte the data of this bit has an error.

The selected operation codes are the second operation codes corresponding to the byte in the Y second operation codes. The correspondence here refers to that the data of the byte has participated in the encoding operation of the second operation codes. Specifically, in the Y second operation codes, each second operation code is obtained by executing encoding operation on all the data in different bytes. It is to be understood that for a byte, if all the data in the byte participate in the encoding operation, the second operations codes obtained are defined as the second operation codes corresponding to the byte. It can be seen that since the second operation codes obtained by different bytes participating in the encoding operation are not exactly the same, the Y second operation codes may be used to execute error detection and/or error correction on the M bytes.

Since the second operation codes are used to execute error detection and/or error correction on the M bytes, for the first AND gate unit 302, the second operation codes corresponding to the byte, namely the selected operation codes, are taken as the input of the first AND gate unit 302. If the storage system has the 1-bit error data and the data in this byte has an error, the selected operation codes will be affected, so that the output result of the first AND gate unit 302 will be affected. For the NOR gate unit 303, the second operation codes other than the selected operation codes among all the second operation codes are the unselected operation codes, which are used as the input of the NOR gate unit 303. If the storage system has the 1-bit error data and the data in this byte has an error, the unselected operation codes will not be affected, and the output result of the NOR gate unit 303 is not affected. Similarly, if the storage system has the 1-bit error data and the data in this byte does not have an error, the unselected operation codes will be affected, and the output result of the NOR gate unit 303 is affected.

Each second AND gate unit 304 is connected with a first decoding signal, the output end of the first AND gate unit 302 and the output end of the NOR gate unit 303, so that the output end of each second AND gate unit 304 is affected by the data of each bit in the byte, that is, it can be learned through the output ends of the second AND gate units 304 whether the data of each bit corresponding to the byte has an error.

For example, if the byte has the 1-bit error data, and the erroneous data is located in a 1st bit, the first decoding signal corresponding to the 1st bit is defined as a mark decoding signal, and then the output result of the second AND gate unit 304 receiving the mark decoding signal does not meet the expectation and is different from that of other second AND gate units 304. Thus, it is inversely deduced that the data of the 1st bit is the erroneous data. If all the data in the byte are correct data, the output results of all the second AND gate units 304 are the same and meet expectation. Thus, it is inversely deduced that the erroneous data does not exist in the byte.

It is to be understood that in an example, the storage system 101 includes a storage chip. The error state determining unit 30 and the M decoding units 31 all may be integrated in the storage chip.

In the error correction system 1 provided by the embodiment, the circuit of the decoding unit 31 corresponding to each byte may be set as the same circuit, except that the first operation codes and the second operation codes connected to each input end in different decoding units 31 are different, which facilitates saving of the line and area of all the decoding units in the error correction system, and may execute decoding processing on all the bytes at the same time to execute error detection and/or error correction. Therefore, the error detection and error correction speed of the error correction system can be improved.

The error correction system will be further described below in combination with the working principle of the storage system.

Specifically, the storage system 101 may be a DRAM, for example, which may be DDR4, LPDDR4, DDR5 or LPDDR5. The storage system 101 may be the storage system of another type, for example, a non-volatile memory such as NAND, NOR, FeRAM, PcRAM, and the like.

For the storage system 101, the data are divided into different types. Generally, the bytes are basic units of data processing. Information is stored and interpreted in bytes. It is specified that one byte is composed of 8 binary bits, that is, one byte is equal to 8 bits, and each bit in the 8 bits has a corresponding bit, that is, 1 Byte=8 bit. Based thereon, in the embodiment, N is 8 to maximize the bits in each byte, thus facilitating improvement of the utilization of the circuit required for a comparison system 20. It is to be understood that in another embodiment, N may be another suitable positive integer.

Taking the data transmitted by the storage system 101 during a single read-write operation as 128 bits (i.e. 128 bits) as an example, M is 16 and N is 8. It is to be noted that in another embodiment, according to the difference of data bits transmitted by the storage system during the read-write operation, M may also be another suitable positive integer, so long as M*N is equal to the data bits transmitted during the read-write operation.

Figure 4:
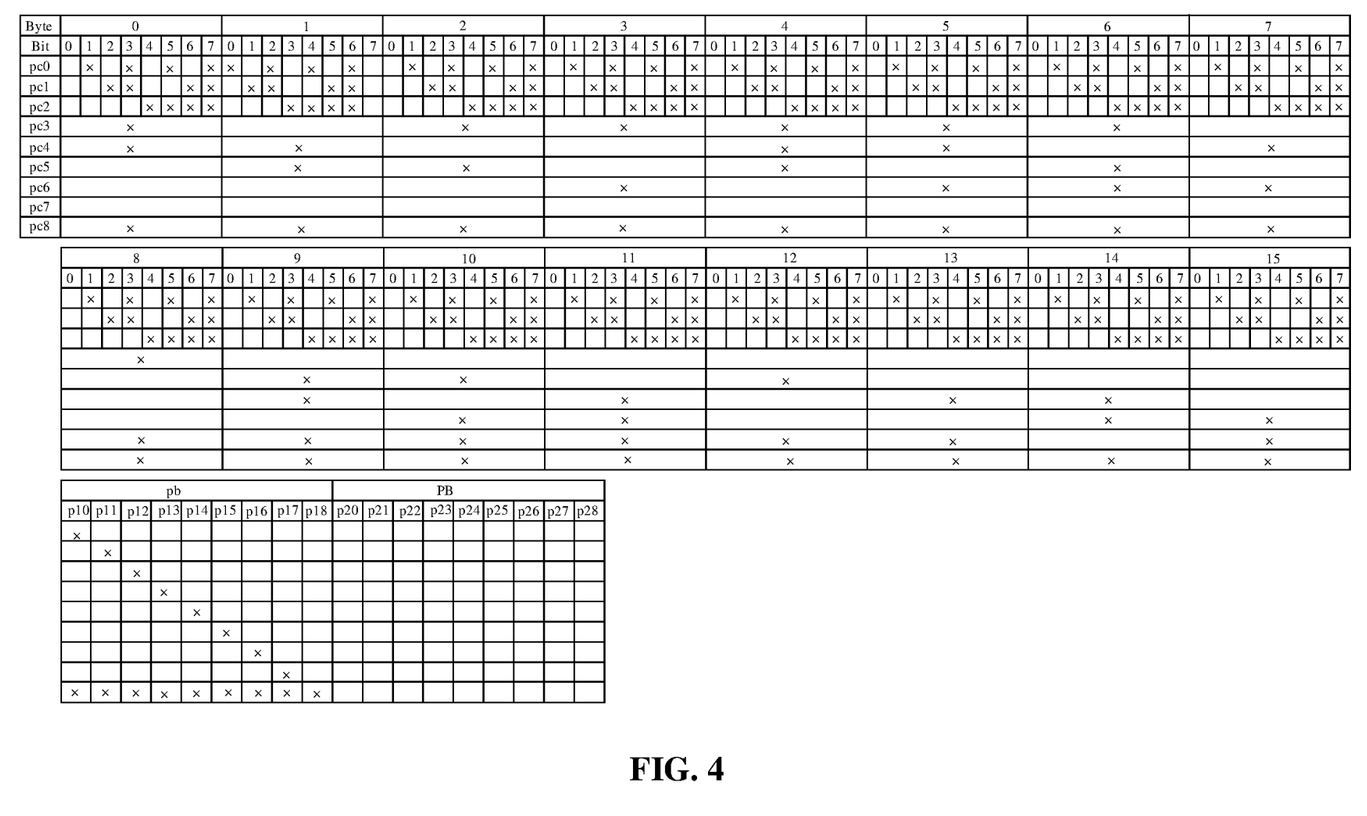
FIG. 4 is a diagram illustrating classification of multiple pieces of data and a diagram illustrating a relation among first check codes, second check codes and third check codes according to an embodiment of the present disclosure.
Figure 5:
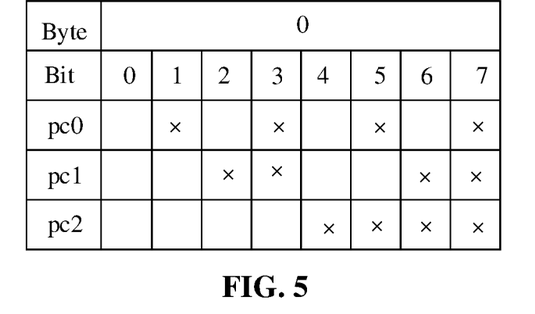
FIG. 5 illustrates an enlarged diagram of first check codes corresponding to byte 0.

FIG. 4 is a classification diagram of multiple pieces of data and a relation diagram of a first check code, a second check code and a third check code according to an embodiment of the present disclosure. The bits where the respective N pieces of data locate are different. Specifically, as shown in FIG. 4, for each byte, the N pieces of data have bits incremented from the 0th to the 7th in accordance with natural numbers. For all bytes, the M bytes are divided into 16 bytes incremented from the 0th to the 15th in accordance with the natural numbers. In addition, for different bytes, the N pieces of data in the bytes all have 8 bits incremented from the 0th to the 7th. It is to be noted that, due to the limitation of location, FIG. 4 should actually be the tables in the same row split into three tables, which are actually a complete table. For the sake of illustration, FIG. 5 shows an enlarged schematic diagram of the first check code corresponding to byte 0.

Figure 6:
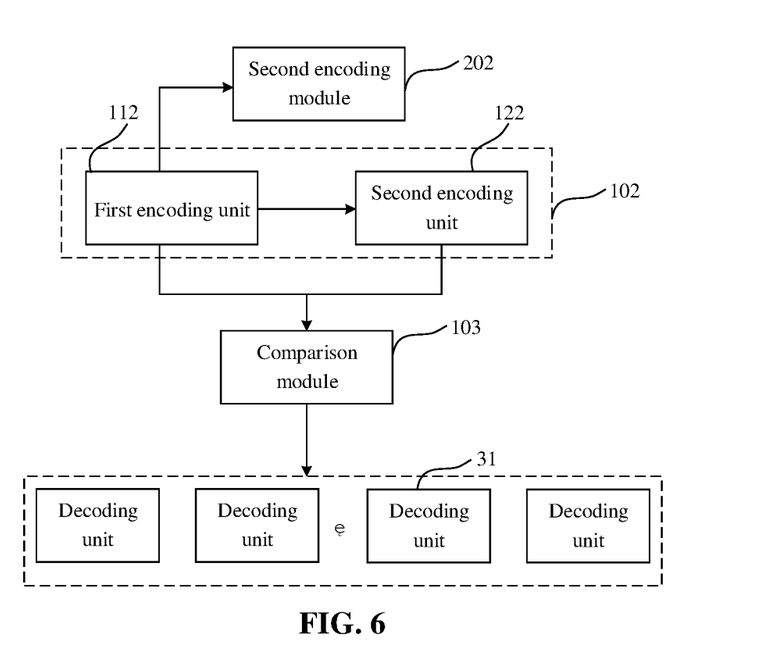
FIG. 6 is a schematic structural diagram of an error correction system according to an embodiment of the present disclosure.

FIG. 6 is a schematic structural diagram of an error correction system according to an embodiment of the present disclosure.

Referring to FIG. 6, the error correction system 1 further includes: a first encoding module 102. The first encoding module is configured to generate X first check codes based on two or more pieces of data of the multiple pieces of data in each byte during a reading operation and a writing operation. The bits where the two or more pieces of data corresponding to the same first check code locate are the same in different bytes. And the first encoding module is configured to generate Y second check codes based on all data in multiple bytes. The X first check codes are used to execute error detection and/or error correction on the N pieces of data in each byte, the Y second check codes are used to execute error detection and/or error correction on the M bytes, and X and Y are both positive natural numbers.

The first check codes are used to execute error detection and/or error correction on the N pieces of data in each byte. The second check codes are used to execute error detection and/or error correction on the M bytes. This error detection and error correction encoding method can not only implement ECC, but also implement ECC with fewer hardware circuits, which facilitates reduction of the power consumption of the storage system and optimization of the speed and results of ECC.

It is to be noted that the first operation codes in the embodiment are used to execute error detection and/or error correction on the N pieces of data in each byte, and the second operation codes are used to execute error detection and/or error correction on the M bytes. It is to be understood that all the first operation codes and the second operation codes are jointly used to execute error detection and/or error correction on all the data in the M bytes, the second operation codes are used to locate which byte of the M bytes the erroneous data is located, and the first operation codes are used to locate which bit of the byte the erroneous data is located.

In the embodiment, the first encoding module 102 uses a Parity Check principle to generate the first check codes and the second check codes. Accordingly, the first check codes and the second check codes are all parity check codes. Specifically, the first encoding module 102 includes: a first encoding unit 112, configured to acquire the X first check codes and the Y second check codes based on a plurality of pieces of written data during the writing operation; and a second encoding unit 122, configured to acquire X first updated check codes and Y second updated check codes based on a plurality of pieces of to-be-read data during the reading operation. The acquisition method of the first updated check codes is the same as that of the first check codes, and the acquisition method of the second updated check codes is the same as that of the second check codes. The first operation codes are acquired based on the first check codes and the first updated check codes, and the second operation codes are acquired based on the second check codes and the second updated check codes.

The X first check codes constitute X bits of first binary numbers, where $2^X \geq N$. Each first check code is acquired by performing a first encoding operation on two or more pieces of data of the multiple pieces of data in all bytes, and the two or more pieces of data corresponding to each first check code correspond to different bit combinations in the bytes. That is, each first check code is acquired by selecting the data of a plurality of bits from each byte for the first encoding operation. For the same first check code, the selected bit combinations are the same in all bytes, and for different first check codes, the selected bit combinations in the N pieces of data are different.

The N pieces of data have bits incremented from the 0th to the (N−1)th in accordance with natural numbers, and the first check codes acquired by selecting each bit for the first encoding operation are not exactly the same. Specifically, different first check codes are acquired by performing the first encoding operation based on the different data in all the bytes, so that the bytes affecting the results of the first check codes are different for different first check codes. Meanwhile, due to the fact that $2^X \geq N$, the first check codes acquired by selecting each of the bits to execute the first encoding operation may not be exactly the same, so that through analysis, corresponding to which bit the data has an error may be acquired.

In the embodiment, X is 3, which can not only satisfy that the errors of different bits of data can be indicated, but also reduce the complexity of the hardware circuit of the first encoding unit 112.

In a specific example, the 3 first check codes, in a sequence from a low bit to a high bit in accordance with the bits, include a 0th-bit first check code, a 1st-bit first check code and a 2nd-bit first check code. The N pieces of data have bits incremented from the 0th to the (N−1)th in accordance with the natural numbers. For example, for a 0th bit, it does not participate in the first encoding operation corresponding to any first check code. For a 1st bit, it participates in the first encoding operation corresponding to the 0th-bit first check code. For a 2nd bit, it participates in the first encoding operation corresponding to the 1st-bit first check code. For a 3rd bit, it participates in the first encoding operations corresponding to the 0th-bit first check code and the 1st-bit first check code. For a 4th bit, it participates in the first encoding operation corresponding to the 2nd-bit first check code. For a 5th bit, it participates in the first encoding operations corresponding to the 0th-bit first check code and the 2nd-bit first check code. For a 6th bit, it participates in the first encoding operations corresponding to the 1st-bit first check code and the 2nd-bit first check code. For a 7th bit, it participates in the first encoding operations corresponding to the 0th-bit first check code, the 1st-bit first check code and the 2nd-bit first check code. It is to be understood that those skilled in the art may set the number of the first check codes and other encoding operation relations as needed, as long as the first check codes acquired by selecting each of the bits to execute the first encoding operation are not exactly the same.

In the embodiment, the first encoding operation is XOR. Accordingly, the first encoding unit 112 is configured such that in the X bits of first binary numbers, the first check code at the lowest bit is the XOR of the data of the 1st, 3rd, 5th and 7th bits in all bytes, the first check code at the highest bit is the XOR of the data of the 4th, 5th, 6th and 7th bits in all the bytes, and the first check code at the middle bit is the XOR of the data of the 2nd, 3rd, 6th and 7th bits in all the bytes.

It is to be noted that in another embodiment, the first encoding operation may also be XNOR. Accordingly, the first encoding unit is configured such that in the X bits of first binary numbers, the first check code at the lowest bit is the XNOR of the data of the 1st, 3rd, 5th and 7th bits in all the bytes, the first check code at the highest bit is the XNOR of the data of the 4th, 5th, 6th and 7th bits in all the bytes, and the first check code at the middle bit is the XNOR of the data of the 2nd, 3rd, 6th and 7th bits in all the bytes.

The generation principle of the first check codes will be explained with reference to FIG. 4 and FIG. 5.

As shown in FIG. 4 and FIG. 5, "x" indicates that it is currently participating in the encoding operation of this row, that is, executing XNOR or XOR. The 128 bits of data are divided into 16 bytes from 0th to 15th, and each byte has 8 bits. p10, p11 and p12 represent three first check codes. p13, p14, p15, p16 and p17 represent 5 second check codes. pc0 to pc7 represent 8 expressions correspondingly employed by p10 to p17 when the encoding operation is executed. In each row, all locations with a tag "X" indicate that the data corresponding to this column needs to participate in XOR or XNOR in this expression. The first check codes and the second check codes correspond to pb.

During the first encoding operation or the second encoding operation in the encoding stage during the writing operation, the first encoding operation or the second encoding operation is performed by using the 8 expressions of pc0 to pc7, and the operation results are stored in p10 to p17 respectively. p10 to p17 do not participate in the first encoding operation or the second encoding operation. In the decoding stage, the expression corresponding to each row remains unchanged, and the stored p10 to p17 need to participate in the operation. Therefore, p10 to p17 are correspondingly marked with "X" in the table of FIG. 4. This will be described in detail later.

Specifically, in the encoding stage during the writing operation, for each byte, the data of the 1st, 3rd, 5th and 7th bits in this byte are subjected to XOR or XNOR, then all XOR results or XNOR results of the 16 bytes are subjected to XOR or XNOR, namely a pc0 expression, and the operation result is given to p10. For each byte, the data of the 2nd, 3rd, 6th and 7th bits in this byte are subjected to XOR or XNOR, then all XOR results or XNOR results of the 16 bytes are subjected to XOR or XNOR, namely a pc1 expression, and the operation result is given to p11. For each byte, the data of the 4th, 5th, 6th and 7th bits in this byte are subjected to XOR or XNOR, then all XOR results or XNOR results of the 16 bytes are subjected to XOR or XNOR, namely a pc2 expression, and the operation result is given to p12.

p10, p11 and p12 constitute the first binary numbers. p10 is the lowest bit and p12 is the highest bit. On the premise that only one bit of data in the multiple pieces of data of the memory has an error, it can be seen the following operations.

If the 0th bit of data has an error, due to the fact that the 0th bit does not participate in these three expressions of pc0, pc1 and pc2, none of the first check codes p10, p11 and p12 are not affected.

If the 1st bit of data has an error, due to the fact that the 1st bit participates in the expression of pc0 but does not participate in these two expressions of pc1 and pc2, the first check code p10 is affected but the first check codes p11 and p12 are not affected.

If the 2nd bit of data has an error, due to the fact that the 2nd bit participates in the expression of pc1, the first check codes p10 and p12 are not affected but the first check code p11 is affected.

If the 3rd bit of data has an error, due to the fact that the 3rd bit participates in these two expressions of pc0 and pc1, the first check codes p10 and p11 are both affected but the first check code p12 is not affected.

By analogy, if the 7th bit of data has an error, due to the fact that the 7th bit participates in these three expressions of pc0, pc1 and pc2, the first check codes p10, p11 and p12 are affected.

It is to be noted that a specific first check code is affected after a specific data has an error here means that after the specific data has an error, the specific first check code acquired by re-performing the first encoding operation may be different from the first check code formed before the data has an error.

It is to be understood that for each expression, due to the fact that the bits participating in the first encoding operation in different bytes are the same, which bit of data has an error may be obtained through the first check codes, but in which byte the corresponding bit of data has an error may not be detected. Therefore, the second check codes are required for acquiring in which byte the corresponding bit of data has an error.

The Y second check codes constitute Y bits of second binary numbers, where $2^Y \geq M$. Each second check code is acquired by performing a second encoding operation on two or more bytes of the bytes.

$2^Y \geq M$ to ensure that the second check codes obtained by each of the bytes participating in the second encoding operation are not exactly the same. Specifically, different second check codes are acquired by performing the second encoding operation based on different byte sets, so that the bytes affecting the results of the second check codes are different for different second check codes, thus facilitating comprehensive analysis to acquire in which byte the data has an error. Then, which bit in the byte has an error is combined to finally determine which bit of data in which byte has an error. It is noted that the meaning of "affect" in the result of affecting the second check codes here is the same as the meaning of "affect" mentioned above.

In the embodiment, Y is 5, which can not only satisfy that the errors of different bits of data can be indicated, but also reduce the complexity of the hardware circuit of the second encoding unit 112. The second encoding operation is XOR. Correspondingly, the second encoding unit 112 may be configured to include: a first-grade operation unit, configured to execute XOR on all the data of two selected bytes and store a plurality of first operation results, each first operation result being the XOR result of the two selected bytes; and a second-grade operation unit, configured to execute XOR on at least two first operation results, generate the second check codes, and generate Y second check codes based on different encoding requirements. Through the special design of the first encoding unit 112, the second-stage operation unit may reuse the first operation results of the first-stage operation unit, so that the first encoding unit 112 may be implemented through fewer hardware circuits, to reduce the power consumption of the storage system.

In another embodiment, the first encoding operation may be XNOR.

Correspondingly, the first encoding unit may be configured to include: a first-grade operation unit, configured to execute XNOR on all the data of the two selected bytes and store a plurality of first operation results, each first operation result being an XNOR result of the two selected bytes; and a second-grade operation unit, configured to execute XNOR on at least two first operation results, generate the second check codes, and generate Y second check codes based on the different encoding requirements.

Specifically, as shown in FIG. 4, in the encoding stage during the writing operation, for each byte, the data of all 8 bits in the byte are subjected to XOR to obtain an XOR result of the byte. Then, the 16 XOR results of a total of 16 bytes are subjected to the second encoding operation according to the 5 expressions of pc3 to pc7, that is, all the data with the tag "X" in the table of each row participate in the operation, and the second check codes pc13 to pc17 are acquired accordingly. It is to be understood that in the encoding stage, the second check codes pc13 to pc17 do not participate in the encoding operation, and the second check codes pc13 to pc17 also need to participate in the operation in the subsequent decoding stage (or called a deciphering stage). Therefore, in FIG. 4, the second check codes pc13 to pc17 are also marked with "X", which will be explained later and will not be repeated here.

In the embodiment, the M bytes are divided into the 0th to 15th bytes incremented in accordance with natural numbers. The Y second check codes are divided into the 3rd to 7th second check codes incremented in accordance with the natural numbers. The acquisition methods of the 5 second check codes are as follows.

The 3rd second check code (corresponding to p13 in FIG. 4) is the XOR or XNOR of all the data of the 0th, 2nd, 3rd, 4th, 5th, 6th and 8th bytes. The 4th second check code (corresponding to p14 in FIG. 4) is the XOR or XNOR of all the data of the 0th, 1st, 4th, 5th, 7th, 9th, 10th and 12th bytes. The 5th second check code (corresponding to p15 in FIG. 4) is the XOR or XNOR of all the data of the 1st, 2nd, 4th, 6th, 9th, 11th, 13th and 14th bytes. The 6th second check code (corresponding to p16 in FIG. 4) is the XOR or XNOR of all the data of the 3rd, 5th, 6th, 7th, 10th, 11th, 14th and 15th bytes. The 7th second check code (corresponding to p17 in FIG. 4) is the XOR or XNOR of all the data of the 8th, 9th, 10th, 11th, 12th, 13th and 15th bytes.

It is to be noted that each second check code is acquired by an XOR operation. Alternatively, each second check code is acquired by an XNOR operation.

The circuit in the first encoding unit 112, configured to acquiring the second check codes is designed to be: the XOR results of byte 0 and byte 4 are subjected to XOR to obtain a result 0_4. The results of byte 2 and byte 6 are subjected to XOR to obtain a result 2_6. The results of byte 3 and byte 5 are subjected to XOR to obtain a result 3_5. The results of byte 1 and byte 5 are subjected to XOR to obtain a result 1_5. The results of byte 1 and byte 4 are subjected to XOR to obtain a result 1_4.

Figure 7:
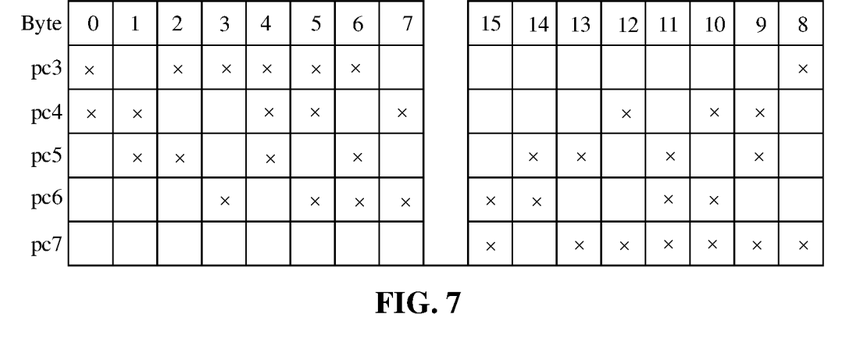
FIG. 7 illustrates a schematic diagram of performing a second encoding operation on all bytes.

It can be seen that, as shown in FIG. 7, FIG. 7 illustrates a schematic diagram of performing the second encoding operation on all the bytes. Compared with bytes 0 to 7, the same set of circuits may be used to complete the operation on byte 8 to byte 15, that is, just changing the input, the same operation may be performed on the byte 8 to the byte 15 to obtain a result 9_13, a result 10_12, a result 11_15, a result 10_14, and a result 11_14. Moreover, in addition to these operations that may use the same circuit, it is also necessary to execute XOR on byte 6 and byte 7 to obtain a result 6_7 and execute XOR on the results of byte 7 and byte 9 to obtain a result 7_9.

XOR is executed according to the requirements of the expressions of pc3 to pc7: for example, according to the expression pc3, the result 0_4, the result 2_6, the result 3_5 and the XOR result of the byte 8 are subjected to XOR to obtain a second check code p13. According to the expression pc4, the result 0_4, the result 1_5, the result 7_9 and the result 10_12 are subjected to XOR to obtain a second check code p14. The acquisition methods of the second check codes p15, p16 and p17 will not be described in detail. It is to be understood that the result 0_4, the result 2_6, etc. may be reused to save circuit resources.

Moreover, in the embodiment, the first encoding unit 112 may also be configured such that for each byte, the number of times of participating in the second encoding operation is a. a satisfies: $(Y-1)/2 \leq a \leq (Y-a)/2$, and a is a positive integer. With such arrangement, in a decoding circuit required for the subsequent decoding stage, the circuit line and area can be reduced, which also facilitates the improvement of the decoding speed.

It can be seen from the foregoing analysis that during the writing operation, the first encoding unit 112 is employed to execute the first encoding operation to acquire the first check codes, and the first encoding unit 112 is employed to execute the second encoding operation to acquire the second check codes. Since the acquisition method of the first updated check codes is the same as that of the first check codes, and the acquisition method of the second updated check codes is the same as that of the second check codes, the second encoding unit 122 will not be described in the embodiment.

In the embodiment, during the reading operation, the second encoding unit 122 is employed to execute the first encoding operation to acquire the first updated check codes, and the second encoding unit 122 is employed to execute the second encoding operation to acquire the second updated check codes. Accordingly, the first encoding unit 112 and the second encoding unit 122 may be the same encoding unit.

The first operation codes are acquired based on the first check codes and the first updated check codes, and the second operation codes are acquired based on the second check codes and the second updated check codes. Specifically, comparison is executed based on the first check codes and the first updated check codes to generate the first operation codes, and comparison is executed based on the second check codes and the second updated check codes to generate the second operation codes. Accordingly, referring to FIG. 6, the error correction system further includes: a comparison module 103. The comparison module 103 is configured to execute the XOR or XNOR on the first check codes and the first updated check codes, to acquire X first operation codes, and execute the XOR or XNOR on the second check codes and the second updated check codes, to acquire Y second operation codes.

More specifically, FIG. 4 and the foregoing description of the generation principle of the first check codes and the second check codes are combined. For the first operation code p20, the received data of different bits in each byte and the first check code p10 are subjected to XOR or XNOR by using the pc0 expression to acquire the first operation code p20. The received data of different bits in each byte and the first check code p11 are subjected to XOR or XNOR by using the pc1 expression to acquire the first operation code p21. The received data of different bits in each byte and the first check code p12 are subjected to XOR or XNOR by using the pc2 expression to obtain the first operation code p22. The first operation codes and the second operation codes correspond to PB in FIG. 2.

Similarly, for the second check codes and the second operation codes, in the encoding operation in the decoding stage, it is necessary to execute XOR again on the second check code p13, p14, p15, p16 or p17 on the basis of the encoding operation in the decoding stage, to acquire the second operation code p23, p24, p25, p26 or p27 correspondingly.

p20, p21 and p22 constitute third binary numbers. p20 is the lowest bit and p22 is the highest bit. On the premise that only one bit of data in the multiple pieces of data of the memory has an error, it can be seen the following situations if the third encoding operation is XOR (may also be XNOR in another embodiment).

If the 0th bit of data has an error, due to the fact that the 0th bit does not participate in these three expressions of pc0, pc3 and pc3, none of the first operation codes p20, p21 and p22 are affected, the three first operation codes are all 0, and a decimal number corresponding to the third binary number 000 is 0 to detect that the 0th bit of data has an error.

If the 1st bit of data has an error, due to the fact that the 1st bit participates in the expression of pc0 but does not participate in these two expressions of pc1 and pc2, the first operation code p20 is affected and is 1, the first operation codes p21 and p22 are not affected and are 0, and the decimal number corresponding to the third binary number 001 is 1 to detect that the 1st bit of data has an error.

If the 2nd bit of data has an error, due to the fact that the 2nd bit participates in the expression of pc1, the first operation code p20 is 0, the first operation codes p21 and p12 are 1 and 0 correspondingly, and the decimal number corresponding to the third binary number 010 is 2, to detect that the 2nd bit of data has an error.

If the 3rd bit of data has an error, due to the fact that the 3rd bit does not participate in these two expressions of pc0 and pc1, the first operation codes p20 and p21 both are 0, p12 is 0, and the decimal number corresponding to the third binary number 011 is 3, to detect that the 3rd bit of data has an error.

By analogy, if the 7th bit of data has an error, due to the fact that the 7th bit participates in these three expressions of pc0, pc1 and pc2, the first operation codes p20, p21 and p22 are all 1, and the decimal number corresponding to the third binary number 111 is 7, to detect that the 7th bit of data has an error.

In addition, the error correction system 1 further includes: a second encoding module 202, configured to acquire a third check code based on the multiple pieces of data, the X first check codes and the Y second check codes during the writing operation.

Specifically, the third check code is acquired by executing a fifth encoding operation on the multiple pieces of data, the X first check codes, and the Y second check codes. In the embodiment, the fifth encoding operation is XOR. Correspondingly, the second encoding unit 202 is configured to execute an XOR operation on the multiple pieces of data, the X first check codes and the Y second check codes to generate the third check code. During the writing operation, the error correction system 1 not only stores the multiple pieces of data, the X first check codes and the Y second check codes but also stores the third check code.

Subsequently, the first check codes, the second check codes and third check code are jointly used to determine the bit number of the erroneous data. Specifically, during subsequent data reading period, a third operation code will be generated based on the multiple pieces of data, the first check codes, the second check codes and the third check code. Since all the data, the first check codes, the second check codes and the third check code participate in the operation of generating the third operation code, if the third operation code is 0, it represents that there is no error or a 2-bit error (assuming that there is only the 2-bit error at most), but it is difficult to determine whether the data has an error only according to the third operation code. If the third operation code is 1, it represents that there is a 1-bit error, but it is difficult to determine whether the data has an error or the first check codes, the second check codes or the third check code has an error only according to the third operation code. It is to be understood that in another embodiment, if 0 means having an error and 1 means having no error, the third operation code is 1, which represents having no error or the 2-bit error. If the third operation code is 0, it represents the 1-bit error.

The generation principle of the third check code will be explained with reference to FIG. 4.

As shown in FIG. 4, p18 represents the third check code and pc8 represents the expression used when executing the fifth encoding operation. Specifically, the first encoding operation and the second encoding operation are first executed to generate the first check codes p10-$p12$ and the second check codes p13-$p17$, and then all the data, the first check codes p10-$p12$ and the second check codes p13-$p17$ are subjected to the fifth encoding operation to acquire the third check code.

More specifically, in the encoding stage, all the data in each byte are subjected to XOR or XNOR, then the XOR result or the XNOR result with the first check codes p10-$p12$ and the second check codes p13-$p17$ is subjected to XOR or XNOR, namely the pc8 expression. The operation result is given to p18 to generate the third check code.

In addition, the second encoding module 202 is further configured to acquire a third operation code based on to-be-read data, the X first check codes, the Y second check codes and the third check code during the writing operation. Specifically, in the decoding stage, the multiple transmitted data, the X first check codes, the Y second check codes and the third check code are received, and a sixth encoding operation is executed based on the multiple pieces of data, the X first check codes, and the Y second check codes to generate the third operation code.

Referring to FIG. 4 and the foregoing description of the generation principle of the third check code, specifically, all the received data, the X first check codes, the Y second check codes and the third check code p18 are subjected to the sixth encoding operation by using the expression pc8 to acquire the third operation code p28.

It can be determined that a bit to which the erroneous data belongs is bit 0, bit 1 or bit 2 in combination with the first operation codes, the second operation codes and the third operation code.

Specifically, the comparison module 103 includes: X first comparison circuits (not shown), each first comparison circuit being configured to receive a first check code and a corresponding first updated check code, and execute XOR or XNOR to acquire a first operation code; and Y second comparison circuits (not shown), each second comparison circuit being used to receive a second check code and a corresponding second updated check code, and execute XOR or XNOR to acquire a second operation code.

Furthermore, the comparison module 103 may further include: a third comparison circuit (not shown), configured to receive the multiple pieces of data, the X first operation codes, the Y second operation codes, and the third check code, and execute XOR or XNOR, to acquire the third operation code.

Figure 8:
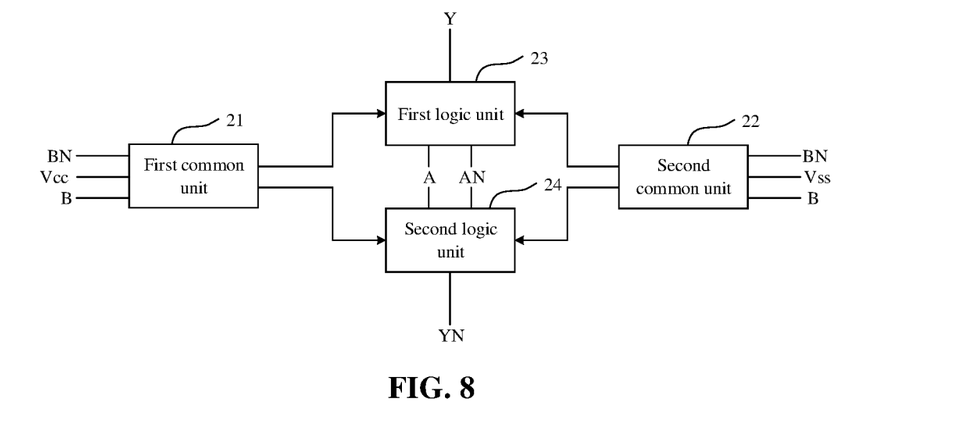
FIG. 8 is a functional block diagram of a first comparison circuit or a second comparison circuit in an error correction system according to an embodiment of the present disclosure.
Figure 9:
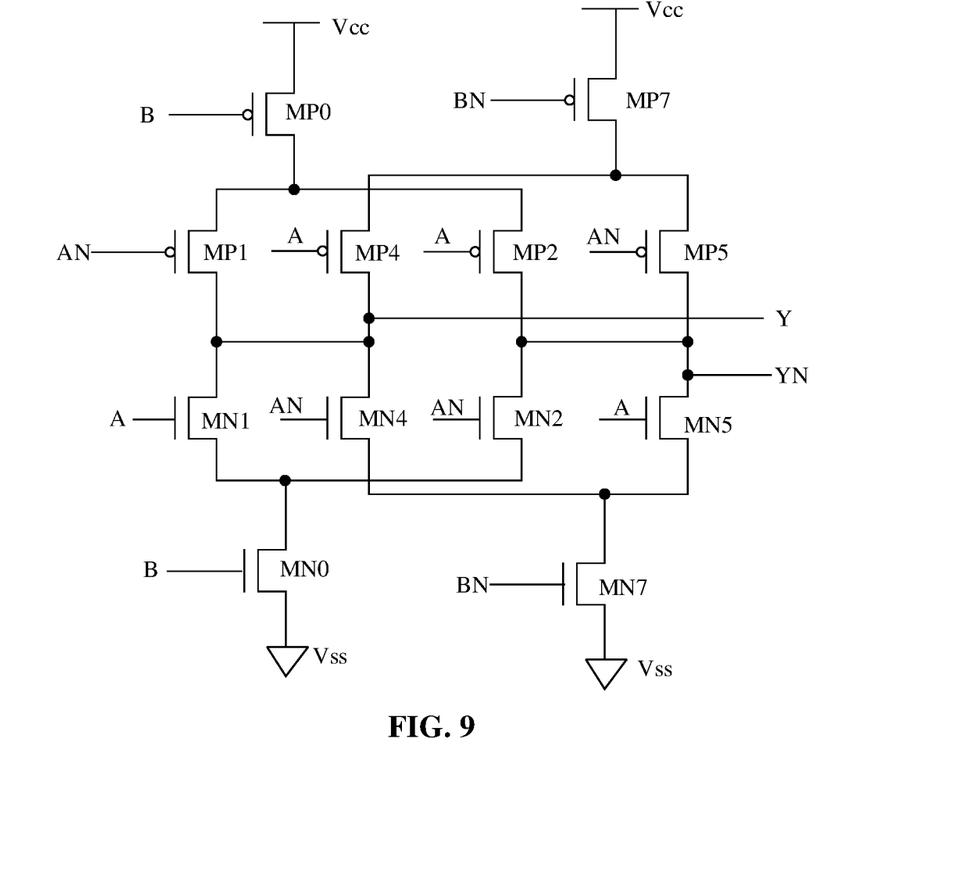
FIG. 9 is a circuit structural diagram of a first comparison circuit or a second comparison circuit in an error correction system according to an embodiment of the present disclosure.

FIG. 8 is a functional block diagram of a first comparison circuit or a second comparison circuit in an error correction system according to an embodiment of the present disclosure. FIG. 9 is a circuit structural diagram of a first comparison circuit or a second comparison circuit in an error correction system according to an embodiment of the present disclosure.

In the embodiment, referring to FIG. 8, the first comparison circuit or the second comparison circuit includes: a common module (not shown), which is connected to a power signal Vcc and a grounding signal Vss and controls the output of the power signal Vcc or the grounding signal Vss based on a first signal B and a second signal BN, the first signal B being inverted with respect to the second signal BN; a first logic unit 23, which is connected to the common module and configured to receive a third signal A and a fourth signal AN, the third signal A being inverted with respect to the fourth signal AN, and output a first operation signal Y, the first operation signal Y being the XOR of the first signal B and the third signal A; and a second logic unit 24, which is connected to the common module and configured to receive the third signal A and the fourth signal AN and output a second operation signal YN, the second operation signal YN being the XNOR of the first signal B and the third signal A. For the first comparison circuit, the first check code is used as the first signal and the first updated check codes are used as the third signal. For the second comparison circuit, the second check codes are used as the first signal and the second updated check codes are used as the third signal.

In the embodiment, referring to FIG. 8, the common module includes: a first common unit 21, which is connected to the power signal Vcc and controls the output of the power signal Vcc based on the first signal B and the second signal BN; and a second common unit 22, which is connected to the grounding signal Vss and controls the output of the grounding signal Vss based on the first signal B and the second signal BN. The first logic unit 23 is connected between the first common unit 21 and the second common unit 22. The second logic unit 24 is connected between the first common unit 21 and the second common unit 22.

Specifically, referring to FIG. 9, the first common unit 21 includes: a zeroth PMOS transistor MP0, whose gate receives the first signal B and whose source is connected to the power signal Vcc; and a seventh PMOS transistor MP7, whose gate receives the second signal BN and whose source is connected to the power signal Vcc. When the first signal B is at a high level and the second signal BN is at a low level, the zeroth PMOS transistor MP0 is turned off and the seventh PMOS transistor MP7 is turned on. When the first signal B is at a low level and the second signal BN is at a high level, the zeroth PMOS transistor MP0 is turned on and the seventh PMOS transistor MP7 is turned off.

The second common unit 22 includes: a zeroth NMOS transistor MN0, whose gate receives the first signal B and whose source is connected to the grounding signal Vss; and a seventh NMOS transistor MN7, whose gate receives the second signal BN and whose source is connected to the grounding signal Vss. When the first signal B is at a high level and the second signal BN is at a low level, the zeroth NMOS transistor MN0 is turned on and the seventh NMOS transistor MN7 is turned off. When the first signal B is at a low level and the second signal BN is at a high level, the zeroth NMOS transistor MN0 is turned off and the seventh NMOS transistor MN7 is turned on.

In the embodiment, the first logic unit 23 includes: a first PMOS transistor MP1, whose gate receives a fourth signal AN and whose source is connected to a drain of the zeroth PMOS transistor MP0; a first NMOS transistor MN1, whose gate receives the third signal A, whose drain is connected to a drain of the first PMOS transistor MP1, and whose source is connected to a drain of the zeroth NMOS transistor MN0; a fourth PMOS transistor MP4, whose gate receives the third signal A and whose source is connected to a drain of the seventh PMOS transistor MP7; and a fourth NMOS transistor MN4, whose gate receives the fourth signal AN, whose drain is connected to a drain of the fourth PMOS transistor MP4, and whose source is connected to a drain of the seventh NMOS transistor MN7.

The second logic unit 24 includes: a second PMOS transistor MP2, whose gate receives the third signal A and whose source is connected to a drain of the zeroth PMOS transistor MP0; a second NMOS transistor MN2, whose gate receives the fourth signal AN, whose drain is connected to a drain of the second PMOS transistor MP2, and whose source is connected to a drain of the zeroth NMOS transistor MN0; a fifth PMOS transistor MP5, whose gate receives the fourth signal AN and whose source is connected to a drain of the seventh PMOS transistor MP7; and a fifth NMOS transistor MN5, whose gate receives the third signal A, whose drain is connected to a drain of the fifth PMOS transistor MP5, and whose source is connected to a drain of the seventh NMOS transistor MN7.

In addition, the drain of the first PMOS transistor MP1 is connected to the drain of the fourth PMOS transistor MP4 to output a first operation signal Y; and the drain of the second PMOS transistor MP2 is connected with the drain of the fifth PMOS transistor MP5 to output a second operation signal YN.

The first logic unit 23 configured to achieve XOR logic and the second logic unit 24 configured to achieve XNOR logic are connected to the same common module, so the area occupied by the circuit structure of the common module may be reduced, so that the circuit area corresponding to the first logic unit 23 and the second logic unit 24 can be set larger. Thus, the drive capability of the first logic unit 23 and the second logic unit 24 is improved, the operation rate of the comparison circuit executing the XNOR operation and the XOR operation is improved, and further the error detection and/or error correction rate of the error correction system is facilitated.

Figure 10:
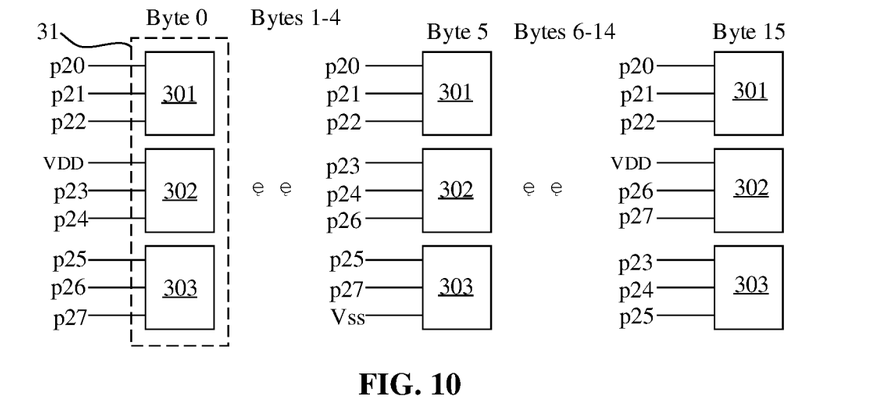
FIG. 10 is another schematic structural diagram of a decoding unit corresponding to a byte according to an embodiment of the present disclosure.
Figure 11:
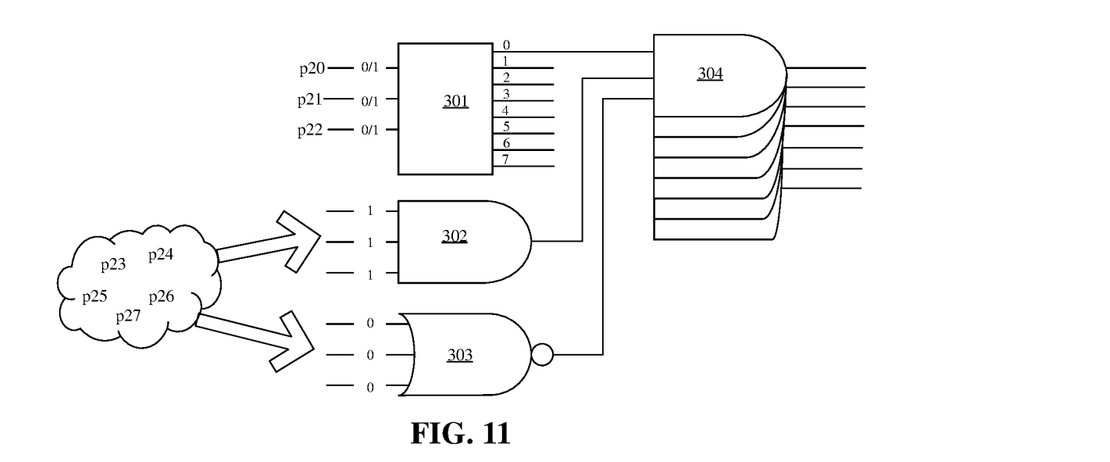
FIG. 11 is an enlarged structure diagram of a decoding unit corresponding to byte 5 in FIG. 10.

The decoding unit 31 will be further described below in combination with the above-mentioned error correction system to generate the first check codes, the second check codes, the first operation codes and the second operation codes. FIG. 10 is another schematic structural diagram of a decoding unit corresponding to a byte according to an embodiment of the present disclosure. FIG. 11 is an enlarged structure diagram of a decoding unit corresponding to byte 5 in FIG. 10.

Referring to FIG. 10 and FIG. 11, in the embodiment, X is 3 and N is 8. Correspondingly, the decoder 301 has 3 input ends and 8 output ends. The number of the second AND gates 304 is 8. Specifically, the decoder 301 is a three-eight decoder. Three input ends receive three first operation codes, respectively and eight output ends output 8 first decoding signals, and each first decoding signal represents the situations of 8 bits of data in the same byte.

In FIG. 10, the first operation codes are marked with p20, p21 and p22, and the second operation codes are marked with p23, p24, p25, p26 and p27. Specifically, each decoding unit 31 executes decoding processing on the X first operation codes and the Y second operation codes. That is, the number of the decoding units 31 is the same as that of the bytes.

It is to be noted that FIG. 11 only illustrates the connection relationship between a first decoding signal and a second AND gate unit 304.

In the embodiment, X is 3 and N is 8, and the decoder 301 is the three-eight decoder. The decoder 301 has 3 input ends and 8 output ends. Three input ends receive the three first operation codes, respectively and eight output ends output 8 first decoding signals. Each first decoding signal represents the situations of 8 bits of data in the same byte.

Specifically, the first operation codes p20, p21 and p22 are 0 or 1, and the output ends are marked with 0 to 7. If the 0th bit has an error and the 0th bit does not participate in the encoding operation of the first operation codes, p20, p21 and p22 are all 0, and the corresponding "0" output end is 1 and the other output ends are all 0. If the 1st bit has an error, p20 is 1 and p21 and p22 are 0, the corresponding "1" output end is 1 and the other output ends are all 0. By analogy, if the 7th bit has an error, p20, p21 and p22 are all 1, and the corresponding "7" output end is 1 and the other output ends are all 0.

It is to be noted that in another embodiment, the number of input ends and the number of output ends of the decoder may also be reasonably set according to the difference between the first check codes and the number of bits in each byte.

The first AND gate unit 302 has the characteristics that if all the input ends are 1, the output ends are 1, and if there is one or more 0s in the input ends, the output ends are 0. In the embodiment, the first AND gate unit 302 has three input ends. The first AND gate unit 302 is further configured such that an input end of the first AND gate unit 302 is connected with a power source VDD if the number of the selected operation codes is 2.

001221 The NOR gate unit 303 has the characteristics that if all the input ends are 0, the outputs are 1, and if there is one or more is in the input ends, the output ends are 0. In the embodiment, the NOR gate unit 303 has three input ends. The NOR gate unit 303 is further configured such that an input end of the NOR gate unit 303 is grounded Vss if the number of the unselected operation codes is 2.

001231 Specifically, the selected operation code corresponds to the second operation code obtained by comparing the second check code corresponding to this byte. The unselected operation code corresponds to the second operation code obtained by comparing the other second check codes except the second check code corresponding to this byte.

For example, for the byte 0, the second operation codes p23 and p24 are the second operation codes obtained by comparing the second check codes p13 and p14 corresponding to the byte 0, then the second operation codes p23 and p24 are input to the input end of the first AND gate unit 302, and the other second operation codes p25, p26 and p27 are input to the input end of the NOR gate unit 303. For the byte 1, the second operation codes p24 and p25 are the second operation codes obtained by comparing the second check codes p14 and p15 corresponding to the byte 1, then the second operation codes p24 and p25 are input to the input end of the first AND gate unit 302, and the other second operation codes p23, p26 and p27 are input to the input end of the NOR gate unit 303. For the byte 4, the second operation codes p23, p24 and p25 are input to the input end of the first AND gate unit 302, and the other second operation codes p26 and p27 are input to the input end of the NOR gate unit 303. The other bytes will not be listed one by one.

The number of the second AND gate units 304 is the same as that of bits in the same byte. In the embodiment, N is 8 and there are 8 second AND gate units 304, correspondingly. According to the outputs of the 8 second AND gate units 304, it is determined whether there is the erroneous data in the byte and which bit has an error.

It can be seen that in the embodiment, the circuits of the decoding units 31 are the same for each byte, but the wiring of the input ends is different; and the wiring of the input ends of the first AND gate unit 302 and the NOR gate unit 303 corresponding to each byte is determined by the 5 expressions of pc3 to pc7 in FIG. 4. For each byte, the second operation codes obtained by comparing the corresponding second check codes are connected to the input end of the first AND gate unit 302, and the second operation codes obtained by comparing the other second check codes except the corresponding second check codes are connected to the input end of the NOR gate unit 303. In addition, the input end of the unused first AND gate unit 302 is connected to the power supply VDD, and the input end of the unused NOR gate unit 303 is grounded Vss. The first operation codes are connected to the input end of the decoder 301. Therefore, the decoding unit 301 only uses 8 lines to connect the input ends, and each line transmits a first operation code or a second operation code, which saves the line track and area, and facilitates the improvement of the decoding speed.

In order to understand the decoding circuit 31, taking the decoding unit corresponding to the byte 5 as an example, the decoding unit 31 will be described in more detail below in combination with the working principle of the decoding unit 31.

If the outputs of the 8 second AND gate units 304 are all 0, it represents that there is no error in all the data in the byte.

001291 If the outputs of the 8 second AND gate units 304 have one 1, it represents that a bit of data in the byte has an error. Specifically, the data of the byte has an error. The second operation codes p23, p24 and p26 are all 1, and the output of the first AND gate unit 302 is 1. The unselected operation codes p25 and p27 are both 0, and the output of the NOR gate unit 303 is 1. This moment, seeing corresponding to which first decoding signal the output of the second AND gate unit 304 is 1 in the N second AND gate units 304, the data of the bit corresponding to this first decoding signal has an error.

It is to be understood that in the embodiment, taking the corresponding bit of data having an error when the first decoding signal is 1 as an example, the corresponding bit of data has no error when the first decoding signal is 0. In another embodiment, it may also be set that if the first decoding signal is 0, the corresponding bit of data has an error, and if the first decoding signal is 1, the corresponding bit of data has no error. Accordingly, other parts may be designed by those skilled in the art as needed, for example, the first decoding signal being connected to the NOR gate circuit and output.

It is to be noted that if none of the data in the M bytes has an error and only one bit of the X first check codes has an error, one of the first operation codes will be 1, and then one of the outputs of the decoder 301 will be 1. However, since the Y second check codes have no error, all the second operation codes are 0. Then the output of the first AND gate unit 302 is 0, and the output of the second AND gate unit 304 is also 0, which represents that none of the data in the M bytes has an error. If none of the data in the M bytes has an error and only one bit of the Y first check codes has an error, the first operation codes are all 0, and then the output end of the decoder 301 is 1. However, since the rest Y−1 second check codes have no error, the corresponding Y−1 second operation codes are 0, the output of the first AND unit 302 is 0, and then the outputs of the second AND gate units 304 are also all 0, which represents that none of the data in the M bytes has an error.

The embodiment provides an error correction system with superior structure and performance. ECC is implemented through the special design of the error correction system, which can not only detect and correct the 1-bit error (if the 1-bit error is located in the data rather than the check codes), but also detect the 2-bit error, and also reduce the hardware circuit. Thus, the power consumption of the error correction system is reduced and the encoding speed and decoding speed are improved. In addition, through the special design of the first check codes and the second check codes, the difference in encoding time for all data combinations is small, and the difference in decoding time for all the data combinations is also small, thus reducing the requirements of the control circuit.

Furthermore, in the embodiment of the present disclosure, the circuit of the decoding unit corresponding to each byte may be set as the same circuit, except that the first operation codes and the second operation codes connected to each input end in different decoding units 31 are different, which facilitates saving of the line and area of all the decoding units in the error correction system, and may execute decoding processing on all the bytes at the same time to execute error detection and/or error correction. Therefore, the error detection and error correction speed of the error correction system can be improved.

Those skilled in the art may understand that the above implementation modes are specific embodiments to implement the present disclosure. However, in practice, various variations may be made in form and details without departing from the spirit and scope of the present disclosure. Any person skilled in the art may make variations and modifications without departing from the spirit and scope of the present disclosure. Therefore, the scope of protection of the present disclosure shall be subject to the scope defined in the claims.

INDUSTRIAL PRACTICABILITY

In the embodiments of the present disclosure, an error correction system is applied to a storage system. The error correction system generates X first operation codes, Y second operation codes and a third operation code based on the storage system. The error correction system includes an error state determining unit and M decoding units. The error state determining unit is configured to identify a current error state. When multiple pieces of data have a 1-bit error, the M decoding units are configured to execute decoding processing on the X first operation codes and the Y second operation codes, to obtain whether there is erroneous data in the bytes corresponding to the decoding units and locate the bits of the erroneous data. Thus, the 1-bit error can be detected and corrected by the embodiments of the present disclosure and a 2-bit error can also be detected.

The invention claimed is:

1. An error correction system, applied to a storage system, wherein the storage system is configured to write or read a plurality of pieces of data during a reading operation or writing operation, the plurality of pieces of data are divided into M bytes, each byte has N pieces of data located in respective bits; the storage system has an encoding stage and a decoding stage, in the decoding stage, the error correction system is configured to generate X first operation codes, Y second operation codes and a third operation code based on the storage system, the X first operation codes, the Y second operation codes and the third operation code are used to determine error states of the plurality of pieces of data, and when the plurality of pieces of data have a 1-bit error, the Y second operation codes are used to locate a specific byte to which the 1-bit error belongs, and the X first operation codes are used to locate a specific bit to which the 1-bit error belongs, and wherein the error correction system comprises:
an error state determining circuit, configured to execute decoding processing on the X first operation codes, the Y second operation codes and the third operation code to identify a current error state; and
M decoding circuits, each decoding circuit corresponding to one byte, configured to execute decoding processing on the X first operation codes and the Y second operation codes, to obtain whether there is erroneous data in the byte and locate a bit to which the erroneous data belongs.

2. The error correction system of claim 1, wherein the decoding circuit comprises:
a decoder, configured to receive the X first operation codes and output N first decoding signals, each first decoding signal corresponding to a bit of the N pieces of data, and N being greater than X;
a first AND gate circuit, configured to receive Z selected operation codes and execute a logic AND operation, the selected operation codes being second operation codes corresponding to the byte in the Y second operation codes;
a NOR gate circuit, configured to receive (Y-Z) unselected operation codes and execute a logic NOR operation, the unselected operation codes being second operation codes except the selected operation codes; and
N second AND gate circuits, an input end of each second AND gate circuit being connected with an output end of the first AND gate circuit, an output end of the NOR gate circuit and a first decoding signal, and error detection and/or error correction being executed on the storage system based on outputs of the N second AND gate circuits;
wherein X, Y and N are all positive natural numbers, Z being an integer greater than or equal to $(Y-1)/2$ and less than or equal to $(Y+1)/2$.

3. The error correction system of claim 2, wherein X is 3, N is 8, the decoder has 3 input ends and 8 output ends, and a number of the second AND gate circuits is 8.

4. The error correction system of claim 2, wherein Y is 5, the first AND gate circuit has 3 input ends; the first AND gate circuit is further configured such that an input end of the first AND gate circuit is connected with a power source if a number of the selected operation codes is 2.

5. The error correction system of claim 2, wherein Y is 5, the NOR gate circuit has three input ends; the NOR gate circuit is further configured such that an input end of the NOR gate circuit is grounded if a number of the unselected operation codes is 2.

6. The error correction system of claim 2, further comprising: a first encoding module, configured to: generate X first check codes based on two or more pieces of data of the plurality of pieces of data in each byte in the encoding stage during a reading operation and a writing operation, bits where the two or more pieces of data corresponding to a same first check code being the same in different bytes; and generate Y second check codes based on all data in two or more bytes of the M bytes; wherein the X first check codes are used to execute error detection and/or error correction on the N pieces of data in each byte, the Y second check codes are used to execute error detection and/or error correction on the M bytes, and X and Y both are positive natural numbers.

7. The error correction system of claim 6, wherein the first encoding module comprises:

a first encoding circuit, configured to acquire X first check codes and Y second check codes based on a plurality of pieces of written data during the writing operation; and a second encoding circuit, configured to acquire X first updated check codes and Y second updated check codes based on a plurality of pieces of to-be-read data during the reading operation, an acquisition method of the first updated check codes being the same as that of the first check codes, and an acquisition method of the second updated check codes being the same as that of the second check codes;

wherein the first operation codes are acquired based on the first check codes and the first updated check codes, and the second operation codes are acquired based on the second check codes and the second updated check codes.

8. The error correction system of claim 7, wherein the first encoding circuit and the second encoding circuit are a same encoding circuit.

9. The error correction system of claim 7, further comprising: a comparison module, wherein the comparison module is configured to execute XOR or XNOR on the first check codes and the first updated check codes to acquire X first operation codes, and execute XOR or XNOR on the second check codes and the second updated check codes to acquire Y second operation codes.

10. The error correction system of claim 9, wherein the comparison module comprises:

X first comparison circuits, each first comparison circuit being configured to receive a first check code and a first updated check code corresponding to the first check code, and execute XOR or XNOR to acquire a first operation code; and Y second comparison circuits, each second comparison circuit being used to receive a second check code and a second updated check code corresponding to the second check code, and execute XOR or XNOR to acquire a second operation code.

11. The error correction system of claim 10, wherein the first comparison circuit or the second comparison circuit comprises:

a common circuit, connected to a power signal and a grounding signal and configured to control to output the power signal or the grounding signal based on a first signal and a second signal, the first signal being inverted with respect to the second signal;

a first logic circuit, connected to the common circuit and configured to receive a third signal and a fourth signal, the third signal being inverted with respect to the fourth signal, and configured to output a first operation signal, the first operation signal being XOR of the first signal and the third signal; and a second logic circuit, connected to the common circuit and configured to receive the third signal and the fourth signal and output a second operation signal, the second operation signal being XNOR of the first signal and the third signal;

wherein for the first comparison circuit, the first check code is used as the first signal, the first updated check code is used as the third signal; and for the second comparison circuit, the second check code is used as the first signal, the second updated check code is used as the third signal.

12. The error correction system of claim 11, wherein the common circuit comprises:

a first common circuit, connected to the power signal and controlling outputting of the power signal based on the first signal and the second signal; and a second common circuit, connected to the grounding signal and controlling outputting of the grounding signal based on the first signal and the second signal;

wherein the first logic circuit is connected between the first common circuit and the second common circuit, the second logic circuit is connected between the first common circuit and the second common circuit.

13. The error correction system of claim 12, wherein the first common circuit comprises:

a zeroth PMOS transistor, having a gate for receiving the first signal and a source connected to the power signal; and a seventh PMOS transistor, having a gate for receiving the second signal and a source connected to the power signal, wherein the second common circuit comprises: a zeroth NMOS transistor, having a gate for receiving the first signal and a source connected to the grounding signal; and a seventh NMOS transistor, having a gate for receiving the second signal and a source connected to the grounding signal.

14. The error correction system of claim 13, wherein the first logic circuit comprises:

a first PMOS transistor, having a gate for receiving the fourth signal, and a source connected to a drain of the zeroth PMOS transistor;

a first NMOS transistor, having a gate for receiving the third signal, a drain connected to a drain of the first PMOS transistor, and a source connected to a drain of the zeroth NMOS transistor;

a fourth PMOS transistor, having a gate for receiving the third signal, and a source connected to a drain of the seventh PMOS transistor; and a fourth NMOS transistor, having a gate for receiving the fourth signal, a drain connected to a drain of the fourth PMOS transistor, and a source connected to a drain of the seventh NMOS transistor.

15. The error correction system of claim 13, wherein the second logic circuit comprises:

a second PMOS transistor, having a gate for receiving the third signal, and a source connected to a drain of the zeroth PMOS transistor;

a second NMOS transistor, having a gate for receiving the fourth signal, a drain connected to a drain of the second PMOS transistor, and a source connected to the drain of the zeroth NMOS transistor;

a fifth PMOS transistor, having a gate for receiving the fourth signal, and a source connected to a drain of the seventh PMOS transistor; and a fifth NMOS transistor, having a gate for receiving the third signal, a drain connected to a drain of the fifth PMOS transistor, and a source connected to a drain of the seventh NMOS transistor.

16. The error correction system of claim 7, further comprising: a second encoding module, configured to acquire a third check code based on the plurality of pieces of data, the X first check codes and the Y second check codes during the writing operation; and further configured to acquire the third operation code based on the a plurality of pieces of to-be-read data, the X first check codes, the Y second check codes and the third check code during the reading operation.

17. The error correction system of claim 1, wherein the storage system comprises a storage chip, and the error state determining circuit and the M decoding circuits are integrated in the storage chip.

* * * * *